Patented Dec. 26, 1933

1,940,944

UNITED STATES PATENT OFFICE 1,940,944

PROCESS FOR BIOLOGICALLY TRANSFORMING CARBON MONOXIDE INTO METHANE

Franz Fischer and Rudolf Lieske, Mulheim-on-the-Ruhr, Germany

No Drawing. Application October 21, 1930, Serial No. 490,329, and in Germany November 1, 1929

5 Claims. (Cl. 260—169)

The transformation of carbon monoxide and hydrogen into methane by catalytic effect (e. g. the use of nickel catalyst) has been known for a considerable time. It has also been known to transform carbonic acid or carbon dioxide biologically to methane in the presence of hydrogen by biological methods, but all attempts to produce methane from carbon monoxide by biological methods have proven unsuccessful.

We now have found that it is possible, in the absence of air, to transform mixtures of carbon monoxide and hydrogen in the most different proportions into methane, by the biological action of certain bacteria. In this way it is, for example, possible to free lighting gas from the toxic carbon monoxide without leaving any trace of the latter, and without substantially reducing the calorific effect of the gas by this process, which cannot be achieved by other processes for the elimination of toxic constituents.

The effective bacteria are long, thin rods, about $0.4\mu$ to $0.7\mu$ in breadth and about $3\mu$ to $10\mu$ in length. Their edges are rounded, they do not possess either spores or flagellums, and they are unmotile. They are gram-positive, but the older rods are sometimes gram-negative. These bacteria are known as plocamo-bacteria (see for instance: Lehmann-Neumann, Bakteriologische Diagnostik, 7 ed., Munich 1927, page 506). They are regularly found in the slime or mud of draining ditches, especially also in the slime or mud of Emscher tanks. The said bacteria may employ carbon monoxide as the sole carbon containing source without requiring other carbonaceous nutrients. On the usual culture-mediums, e. g. meat-extract, peptone, milk, potato, and the like, no accretion is to be observed. In pure solutions, containing said bacteria, the transformation of the carbon monoxide takes place less perfectly than in cultures to which have been added colloidal materials, e. g. earth, putrefaction sludge, aluminium hydroxide, ferric hydrate and the like.

Example 1

300 cm³ of slime were taken from an Emscher tank and placed at the bottom of a flask having a ground stopper and a mercury seal, and the flask herafter was filled with 9700 cubic cc. of illuminating gas. The flask was left at room temperature for 20 days. The preferred temperature is 25–30° C., but the temperature may be as high as 65° C. The gas analyses prior and after the biological transformation gave the following values:

| Gas prior to the reaction; total 9700 cm³ | | Gas after the biological action; total 6425 cm³ | |
|---|---|---|---|
| $CO_2$ | 200 cm³ | $CO_2$ | 0 cm³ |
| $CO$ | 540 cm³ | $CO$ | 0 cm³ |
| $H_2$ | 5500 cm³ | $H_2$ | 2220 cm³ |
| $CH_4$ | 2340 cm³ | $CH_4$ | 3015 cm³ |
| $N_2$ | 1120 cm³ | $N_2$ | 1190 cm³ |

Example 2

A glass-tube of 7.5 cm width and 130 cm length was filled with putrefied slime or sludge taken from Emscher tank and the tube was connected to the illuminating gas supply. The analysis of the gas prior and after its passage through the tube gave the following values:

| Gas prior to the reaction | | Gas after passing through the tube | |
|---|---|---|---|
| | Percent | | Percent |
| $CO_2$ | 2.2 | $CO_2$ | 1.0 |
| Hydrocarbons, especially ethylene and benzol | 1.9 | Hydrocarbons, especially ethylene and benzol | 2.5 |
| $O_2$ | 0.9 | $O_2$ | 0.0 |
| $CO$ | 5.4 | $CO$ | 0.0 |
| $H_2$ | 54.8 | $H_2$ | 46.3 |
| $CH_4$ | 23.5 | $CH_4$ | 31.2 |
| $N_2$ | 11.3 | $N_2$ | 19.0 |

The velocity of flow of the gas passing the tube per day in this embodiment of the process was three times the volume of the tube, the contraction and reduction in volume of the gas amounted to 30%.

For the purpose of practically applying the method for eliminating the toxic constituents from illuminating gas, the gas is made to continuously pass through systems of tubes or through fairly large containers charged with half-dry putrefaction slime or sludge from Emscher tanks or charged with other colloidal material inoculated with the active bacteria, a gas free from carbon monoxide being obtained after passage in a corresponding manner. The velocity of flow of the gas in this process evidently is dependent upon the size of the effective surface of the colloidal material.

In order to further identify the bacteria which are utilized herein, certain essential characteristics thereof are specified as follows:—

Microscopic features

The bacteria form small rods, occasionally also long filaments, in an inorganic nutrient, in a chamber filled with a mixture of carbon monoxide and hydrogen.

*Spores.*—Absent.
*Flagella.*—Absent; motility not observed.
*Colourability.*—Colourable with methylene blue, phenylate of fuchsine and crystal-violet.

The small rods in young cultures are gram-positive, gram fastness small; older rods are gram-negative.

Biochemical reactions

Not pathogenic for white mice.

The bacteria are capable of employing carbon monoxide as the sole source of carbon.

*Relation to oxygen.*—Strictly anaerobic.
*Gelatine liquefactions.*—Negative.
*In nitrate media.*—No gas, no nitrate.
*Chromogenesis.*—Absent.

Carbohydrate reactions

*Diastatic action.*—Negative.

| | |
|---|---|
| From cane sugar | |
| From milk sugar | Neither acid nor gas. |
| From glucose sugar | |

Vegetative cells

*Diameter.*—Between $0.5\mu$ and $1\mu$.
*Length.*—More than double the diameter.
*Chains.*—Absent.
*Capsules.*—Absent.

Spores

Not observed.

Cultural features

*Agar stroke.*—On meat-peptone-agar, no growth; on mineral agar in a chamber filled with a mixture of carbon monoxide and hydrogen, the growth is slight.
*Lustre.*—Translucent.
*Surface.*—Smooth.
*Agar colonies.*—On mineral agar in an atmosphere of carbon monoxide and hydrogen: round, less over 1 mm diameter.
*Gelatine colonies.*—No growth.
*Milk.*—No growth.
*Common nutrient agar.*—No growth.

Physiology

Optimum temperature: 30° C.
Maximum temperature: 60° C.
Minimum temperature: 10° C.
*Chromogenesis.*—Absent.
*Production of indol.*—Absent.
*Production of hydrogen sulphide.*—Absent.

Relation to oxygen

*Aerobic growth.*—Absent.
*Diastatic action.*—Absent.
*Milk.*—No growth.
*Nitrate reduction.*—Not observed; no gas.

Fermentation

| | |
|---|---|
| Dextrose | |
| Lactose | Not fermented. |
| Saccharose | |
| Glycerin | |

Special tests

The bacteria are multiplied rapidly in an atmosphere containing carbon monoxide and hydrogen; they are strictly anaerobic and are capable of employing carbon monoxide as the sole source of carbon.

The bacteria grow well in a nutrient consisting of distilled water 100 parts, $(NH_4)HPO_4$ 0.05 parts, and $K_2HPO_4$ 0.01 parts, with a superposed gas mixture of $\frac{1}{4}$ CO and $\frac{3}{4}$ $H_2$. The nutrient grows slightly turbid, no formation of surface layer or skin is observed.

Having now particularly described and ascertained the nature of our said invention, we declare that what we claim is:—

1. A process for biologically transforming carbon monoxide into methane, consisting in exposing carbon monoxide in the presence of hydrogen to the action of gram-positive, non-sporuliferous plocamo-bacteria of the type described.

2. A process for biologically transforming carbon monoxide into methane, consisting in exposing gas mixtures containing carbon monoxide in the presence of hydrogen to the action of gram-positive, non-sporuliferous plocamo-bacteria of the type described.

3. A process for biologically transforming carbon monoxide into methane, consisting in exposing carbon monoxide in the presence of hydrogen and of colloidal materials to the action of gram-positive, non-sporuliferous plocamo-bacteria of the type described.

4. A process for biologically transforming carbon monoxide into methane, consisting in exposing gas mixtures containing carbon monoxide in the presence of hydrogen and of colloidal materials to the action of gram-positive, non-sporuliferous plocamo-bacteria of the type described.

5. A process for biologically transforming carbon monoxide into methane, consisting in exposing carbon monoxide in the presence of hydrogen to the action of bacteria of the type found in the sludge of an Emscher tank.

FRANZ FISCHER.
RUDOLF LIESKE.